United States Patent [19]

Takanashi et al.

[11] Patent Number: 5,099,261
[45] Date of Patent: Mar. 24, 1992

[54] APPARATUS FOR RECORDING AND REPRODUCING CHARGE LATENT IMAGE

[75] Inventors: Itsuo Takanashi, Kamakura; Shintaro Nakagaki, Fujisawa; Tsutou Asakura, Yokohama; Masato Furuya, Yokosuka; Hirohiko Shinonaga, Yokohama, all of Japan

[73] Assignee: Victor Company of Japan, Ltd., Japan

[21] Appl. No.: 347,640

[22] Filed: May 5, 1989

[30] Foreign Application Priority Data

May 10, 1988 [JP] Japan ................. 63-113306
May 10, 1988 [JP] Japan ................. 63-113307

[51] Int. Cl.$^5$ .................. H04N 1/40; H04N 9/07
[52] U.S. Cl. .................. 358/209; 358/43; 358/44; 358/471; 358/75; 358/909; 365/112
[58] Field of Search .............. 346/153.1, 157; 358/41, 358/43, 44, 55, 209, 225, 471, 75; 359/891; 365/112

[56] References Cited

U.S. PATENT DOCUMENTS

| | | | |
|---|---|---|---|
| 3,195,113 | 7/1965 | Giordano | 346/158 X |
| 3,787,722 | 1/1974 | Hatsell | 346/155 X |
| 4,271,417 | 6/1981 | Blumenthal et al. | 346/154 |
| 4,450,489 | 5/1984 | Barry et al. | 358/348 |
| 4,727,427 | 2/1988 | Kime | 358/217 |
| 4,728,971 | 3/1988 | Van Stiphout et al. | 346/155 |
| 4,786,971 | 11/1988 | Kaneko et al. | 358/208 |

FOREIGN PATENT DOCUMENTS

3712473 10/1987 Fed. Rep. of Germany .
59-186480 10/1984 Japan .
8403388 8/1984 PCT Int'l Appl. .

Primary Examiner—Donald A. Griffin
Attorney, Agent, or Firm—Lowe, Price, LeBlanc, Becker & Shur

[57] ABSTRACT

An apparatus for recording an image information on a recording medium comprises means for charging the recording medium in response to a light from the object; means for forming an effective region and a reference region on the recording medium, the effective region representing the image information, the reference region being charged to a reference potential; a sensing head sequentially detecting surface potentials in the effective region and the reference region of the recording medium through electrostatic induction, the sensing head comprising field effect transistor means; a gate input capacitance of the gate means fo the transistor means being charged by a leakage current between the drain means and the gate means of the transistor means; means for subjecting the gate means of the transistor means to a voltage electrostatically induced in correspondence with the surface potentials in the effective region and in the reference region of the recording medium; means for discharging a charge in the gate input capacitance; and means for timely activating said discharging means with a predetermined timing relation to the detection of the surface potential of one of the effective region and the reference region of the recording medium by the sensing head.

10 Claims, 7 Drawing Sheets

APPARATUS FOR RECORDING AND REPRODUCING CHARGE LATENT IMAGE

BACKGROUND OF THE INVENTION

This invention relates to an apparatus for recording and reproducing a charge latent image.

In some image recording systems, a photoelectric transducer section enables a charge storage member to be charged in accordance with an optical image of an object and thereby allows a charge latent image to be formed on the charge storage member. The distribution of an electric surface potential of the charge storage member represents the optical image. In some reproducing systems, a surface potential sensor of an electrostatic induction type is used. in detecting the distribution of such an electric surface potential and generating a corresponding electric signal.

Since the sensing section of such a surface potential sensor has a high impedance, an impedance converter is generally connected to an output terminal of the sensing section. In the case where the impedance converter uses a field effect transistor, a leakage current from the drain to the gate of the transistor tends to cause an adverse effect such as an inaccuracy in the sensor output signal.

SUMMARY OF THE INVENTION

It is an object of this invention to provide an excellent recording and reproducing apparatus using a charge latent image.

In accordance with this invention, a recording and reproducing apparatus for recording an image information corresponding to an object on a recording medium comprises means for charging the recording medium in response to a light form the object as the image information and forming a charge latent image corresponding to the image information of the recording medium, wherein a surface potential of the recording medium is distributed in correspondence with the latent image; means provided to the charging means for forming an effective region and a reference region on the recording medium, the effective region representing the image information, the reference region being charged to a reference potential and being potentially independent of the image information; a sensing head sequentially detecting surface potentials in the effective region and the reference region of the recording medium through electrostatic induction, the sensing head comprising field effect transistor means having gate means and a drain means; a gate input capacitance of the gate means of the transistor means being charged by a leakage current between the drain means and the gate means of the transistor means; means for subjecting the gate means of the transistor means to a voltage electrostatically induced in correspondence with the surface potentials in the effective region and in the reference region of the recording medium; means for discharging a charge in the gate input capacitance to reset a voltage of the gate means of the transistor means; and means for timely activating said discharging means with a predetermined timing relation to the detection of the surface potential of one of the effective region and the reference region of the recording medium by the sensing head.

A first recording medium of this invention comprises an electrode, and a plurality of sets of parallel strips extending on the electrode and being made of insulating member, wherein the strips in each set are spaced at equal intervals, the electrode being exposed at regions between the strips, the strips generating effective linear portions where information is recorded, wherein the exposed sections of the electrode generate reference portions charged to a reference potential.

A second recording medium of this invention comprises a circular electrode, and image forming members covering first parts of the electrode and forming effective portions capable of storing information, wherein radially-extending second parts of the electrode are exposed and form referece portions incapable of storing information, wherein an information signal is recorded on the recording medium in a form of a charge latent image and simultaneously a spiral recording track is formed on the recording medium.

BRIEF DESCRIPTION OF THE DRAWINGSS

Like and corresponding elements are denoted by the same reference characters throughout the drawings.

DESCRIPTION OF THE FIRST PREFERRED EMBODIMENT

Figure 1:
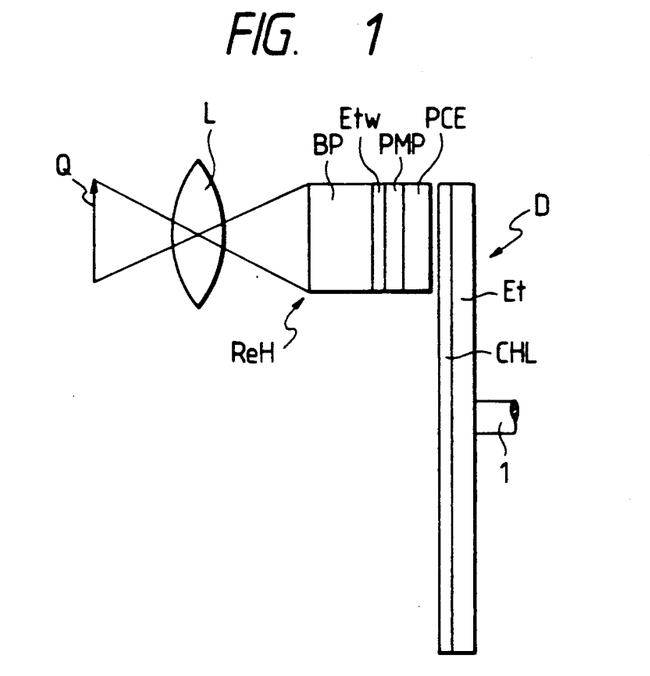
FIG. 1 is a diagram of an apparatus according to a first embodiment of this invention.

With reference to FIG. 1 showing a first embodiment of this invention, a scene of an object Q is focused by a lens L on a recording head ReH which generates a charge latent image on a disk-shaped recording medium D in correspondence with the scene of the object Q.

Figure 2:
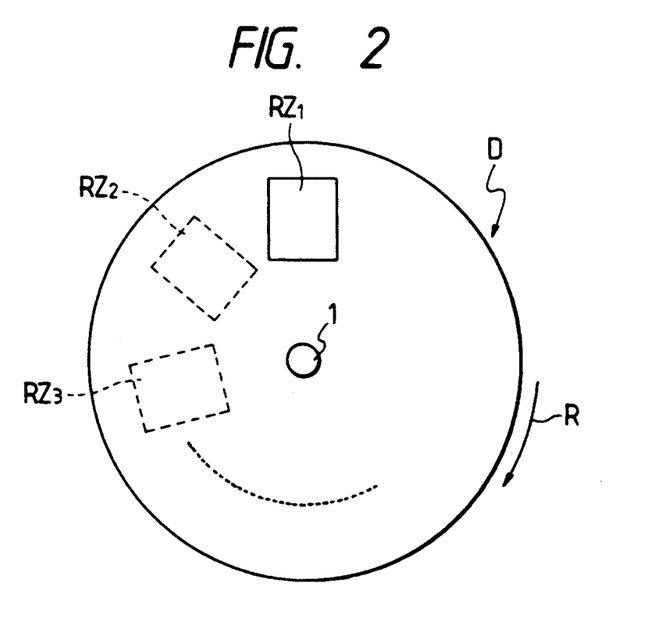
FIG. 2 is a plan view of the recording medium of FIG. 1.

The recording medium D includes an electrode Et and a charge latent image forming member CHL. The electrode Et functions as a base plate of the recording medium D. The image forming member CHL is made of highly insulating material. The recording medium D is rotatable about a shaft 1. As shown in FIG. 2, when the recording medium D rotates in a direction R, the charge latent image of the object Q is sequentially recorded on areas RZ1, RZ2, ... of the recording medium D.

The recording head ReH has a laminated structure including a glass substrate or base plate BP, a transparent electrode Etw, an optical mask PMP, and a photoconductive layer PCE. An electric power source (now shown) is connected between the electrode Etw and the electrode Et of the recording medium D to generate a predetermined electric field between the electrodes Etw and Et.

In a recording process, an image of the object Q is formed by the lens L on the photoconductive layer PCE of the recording head ReH, the electric resistance of the photoconductive layer PCE varies in accordance with the image intensity of the object Q so that a charge latent image is formed on the member CHL of the recording medium D in correspondence with the image of the object Q as disclosed in the European patent application No. 89300633.8 by the same applicant. It should be noted that the recording medium D may have other shapes such as a tape shape, a sheet shape, or a card shape.

Figure 3:
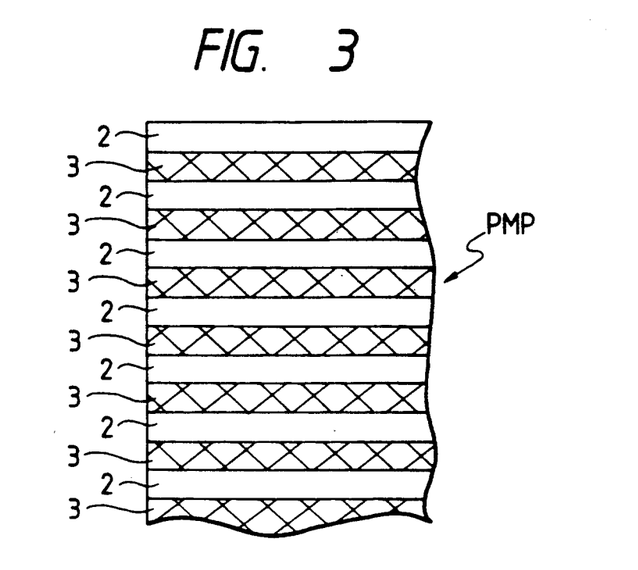
FIG. 3 is a plan view of part of the optical mask of FIG. 1.

As shown in FIG. 3, the optical mask PMP has transparent stripes 2 and opaque stripes 3 extending parallel to each other and alternating with each other. Accordingly, the object image formed on the photoconductive layer PCE is partially overshadowed by spaced parallel black stripes corresponding to the opaque stripes 3 of the optical mask PMP.

Figure 4:
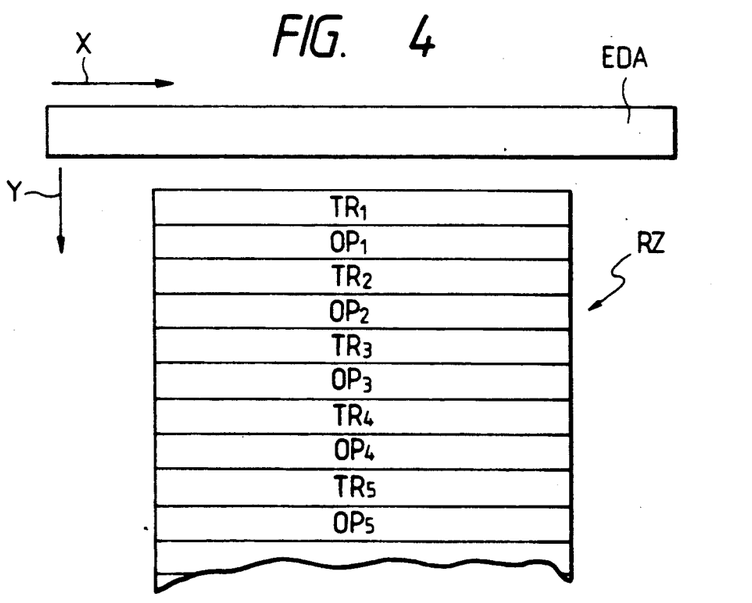
FIG. 4 is a diagram of a sensing head and the recording medium in the apparatus of the first embodiment.

As shown in FIG. 4, an area RZ of the recording medium D which holds a charge latent image is divided into effective linear portions TR1, TR2, ... and reference linear portions OP1, OP2, ... extending parallel to each other and alternating with each other. The effective linear portions TR1, TR2, ... are formed correspondingly to the transparent stripes 2 of the optical mask PMP and thus represent the image of the object Q. The reference linear portions OP1, OP2, ... are formed correspondingly to the opaque stripes 3 of the optical mask PMP and thus represent the minimal reference brightness "black" independent of the image of the object Q.

The charge latent image on the area RZ of the recording medium D is detected by a sensing head EDA which is moved by a suitable drive mechanism (not shown) through a plane immediately above the area RZ during a scanning process.

Figure 5:
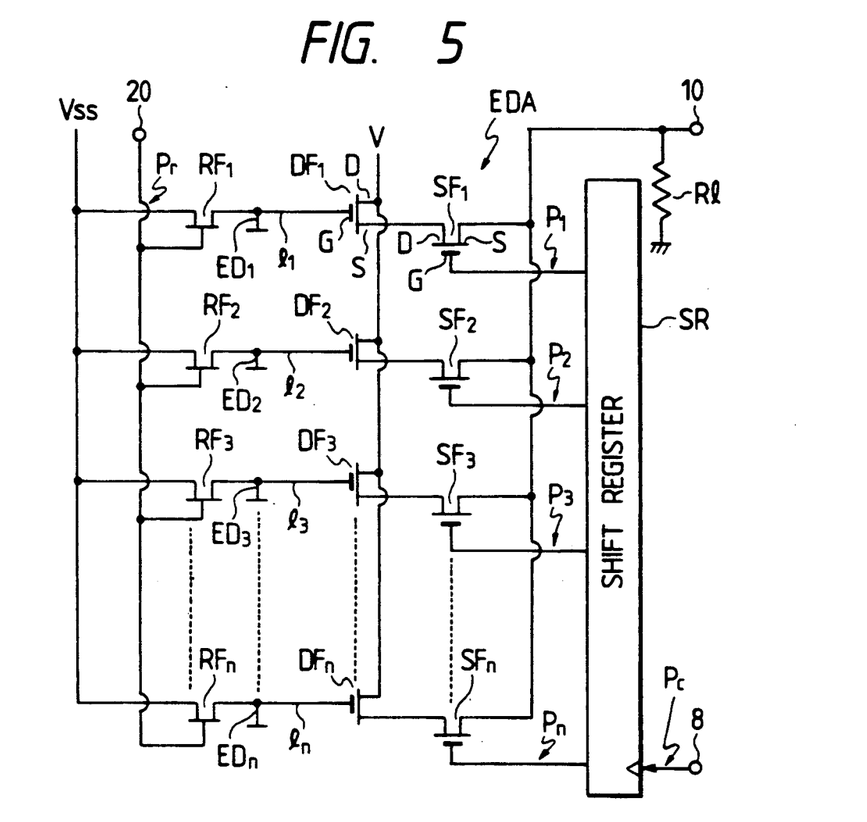
FIG. 5 is a diagram of the sensing head of FIG. 4.

As shown in FIG. 5, the sensing head EDA has sensing electrodes ED1-EDn which are connected to the gates of detecting transistors DF1-DFn via connection lines l1-ln respectively. The sensing electrodes ED1-EDn are also connected to the drains of switching transistors RF1-RFn respectively.

The gates of the switching transistors RF1-RFn are connected in common to an input terminal 20 subjected to a reset pulse signal Pr. The reset pulse signal Pr includes a train of negative going pulses. The sources of the switching transistors RF1-RFn are connected in common to a reference power supply line Vss.

The drains of the detecting transistors DF1-DFn are connected in common to a power supply line V. The sources of the detecting transistors DF1-DFn are connected to the drains of switching transistors SF1-SFn respectively. The sources of the switching transistors SF1-SFn are connected in common to an output terminal 10. A load resistor Rl is connected between the output terminal 10 and the ground.

The switching transistors SF1-SFn serve as switches connecting and disconnecting the detecting transistors DF1-DFn to and from the output terminal 10. In each of the switching transistors SF1-SFn, the source-drain path is made conductive and nonconductive when the gate received a high level voltage and a low level voltage respectively. In other words, each of the switching transistors SF1-SFn is made on and off when its gate receives a high level voltage and a low level voltage respectively.

The gates of the switching transistors SF1-SFn are connected to respective output terminals of a shift register SR and are thus subjected to output signals P1-Pn from the shift register SR. A clock terminal of the shift register SR receives a clock signal Pc via a clock input terminal 8, the clock signal Pc taking a waveform as shown in FIG. 7.

Figure 7:
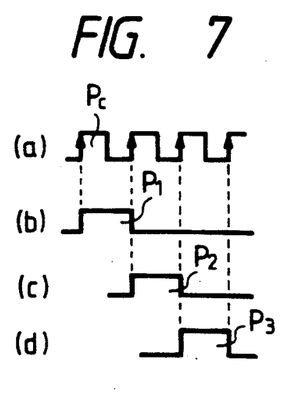
FIG. 7 is a timing diagram showing the waveforms of signals in the sensing head of FIG. 5.

As shown in FIG. 7, the output signals P1-Pn from the shift register SR sequentially assume high levels in response to the input clock signal Pc. Accordingly, the switching transistors SF1-SFn are sequentially made on in accordance with the clock signal Pc.

Figure 6:
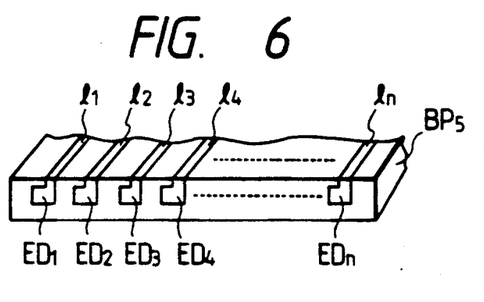
FIG. 6 is a perspective view of part of the sensing head of FIG. 5.

As shown in FIG. 6, the sensing head EDA includes a substrate BP5 on which the sensing electrodes ED1-EDn and the connection lines l1-ln are formed. The sensing electrodes ED1-EDn are arranged in a line.

The apparatus operates as follows. The sensing head EDa is placed close to the recording medium D. The recording medium D is previuosly charged in correspondence with an optical image of the object Q and thus has a charge latent image. The distribution of a surface (electric) potential at a recording surface of the recording medium D represents the charge latent image. The sensing electrodes ED1-EDn are opposed to the recording surface of the recording medium D. By electrostatic induction, the sensing electrodes ED1—EDn are subjected to voltages corresponding to surface potentials of portions of the recording medium D which oppose the sensing electrodes ED1-EDn respectively. The induced voltages are transmitted from the sensing electrodes ED1-EDn to the gates of the detecting transistors DF1-DFn via the connection lines l1-l1 respectively.

During a detecting mode of operation of the sensing head EDA, the switching transistors SF1-SFn are sequentially made on. Accordingly, voltage signals corresponding to the voltages of the gates of the detecting transistors DF1-DFn are sequentially transmitted from the sources of the detecting transistors DF1-DFn to the output terminal 10 via the source-drain paths of the switching transistors SF1-SFn. Thus, an output signal generated at the output terminal 10 has a time-domaim variation which corresponds to the distribution of the surface potential of the linear portion of the recording medium D.

During a resetting mode of operation of the sensing head EDA, the reset pulse signal Pr makes the switching transistors RF1-RFn conductive so that the voltages of the sensing electrodes ED1-EDn and the gates of the detecting transistors DF1-DFn are reset to the reference voltage Vss. As a matter of fact, a leakage current from the drain to the gate of each of the detecting transistors DF1-DFn charges a gate input capacitance of the detecting transistor and thereby gradually increases the voltage at the gate of the detecting transistor. The previously-mentioned resetting prevents the gate voltages of the detecting transistors DF1-DFn from being unacceptably increased by the leakage currents so that the detection output signal from the sensing head EDA is kept accurate.

As will be described hereinafter, the detecting mode and the resetting mode of operation of the sensing head EDA are periodically and alternately performed while the sensing head EDA is moved through the plane immediately above the area RZ of the recording medium D to scan the area RZ completely. During the scan of the area RZ of the recording medium D, the line of the sensing electrodes ED1-EDn of the sensing head EDA is held parallel to the linear portions TR1, TR2, . . . OP1, OP2, . . . and the sensing head EDA is moved step by step along a direction perpendicular to the linear portions TR1, TR2, . . . and OP1, OP2, . . . .

Firstly, the sensing head EDA is moved to and held in a position directly above the first effective linear portion TR1 of the area RZ of the recording medium D. When the sensing head EDA remains directly above the first effective linear portion TR1 of the area RZ of the recording medium D, the detecting mode of operation of the sensing head EDA is performed so that the recording medium D is scanned along the effective linear portion TR1. In this case, the output signal from the sensing head EDA represents the distribution of the surface potential of the effective linear portion TR1 which corresponds to the part of the charge latent image formed on the effective linear portion TR1.

After the scan of the effective linear portion TR1 of the area RZ of the recording medium D is completed, the sensing head EDA is moved to a position directly above the first reference linear portion OP1 of the area RZ. When the sensing head EDA resides above the reference linear portion OP1 of the area RZ, the resetting mode of operation of the sensing head EDA is performed so that the voltages at the gates of the detecting transistors DF1-DFn are reset to the reference voltage Vss. For this purpose, the reset pulse signal Pr is generated by a reset pulse generator (not shown) in a predetermined timing relation to the detecting operation by the sensing head EDA and is supplied to a terminal 20.

After the resetting mode of operation of the sensing head EDA is completed in respect of the first reference linear portion OP1 of the area RZ of the recording medium D, the sensing head EDA is moved to and held in a position directly above the second effective linear poriton TR2 of the area RZ of the recording medium D. When the sensing head EDA remains directly above the second effective linear portion TR2 of the area RZ of the recording medium D, the detecting mode of operation of the sensing head EDA is performed so that the recording medium D is scanned along the effective linear portion TR2. In this case, the output signal from the sensing head EDA represents the distribution of the surface potential of the effective linear portion TR2 which corresponds to the part of the charge latent image formed on the effective linear portion TR2.

After the scan of the effective linear portion TR2 of the area RZ of the recording medium D is completed, the sensing head EDA is moved to a position directly above the second reference linear poriton OP2 of the area RZ. When the sensing head EDA resides above the reference linear portion OP2 of the area RZ, the resetting mode of operation of the sensing head EDA is performed so that the voltages at the gates of the detecting transistors DF1-DFn are reset to the reference voltage Vss.

Similarly, the detecting mode of operation of the sensing head EDA is performed when the sensing head EDA resides above each of the subsequent effective linear portions TR3, TR4, . . . of the area RZ of the recording medium D. In addition, the resetting mode of operation of the sensing head EDA is performed when the sensing head EDA resides above each of the subsequent reference linear portions OP3, OP4, . . . of the area RZ of the recording medium D.

In a modification of this embodiment, the detecting mode of operation of the sensing head EDA is performed when the sensing head EDA resides above each of the reference linear portions OP1, OP2, . . . of the area RZ of the recording medium D. In addition, the resetting mode of operation of the sensing head EDA is performed when the sensing head EDA resides above each of the effective linear portions TR1, TR2, . . . of the area RZ of the recording medium D. The output signal from the sensing head EDA in this modification has a polarity opposite to the polarity of the output signal from the sensing head EDA in the non-modified case.

DESCRIPTION OF THE SECOND PREFERRED EMBODIMENT

Figure 8:
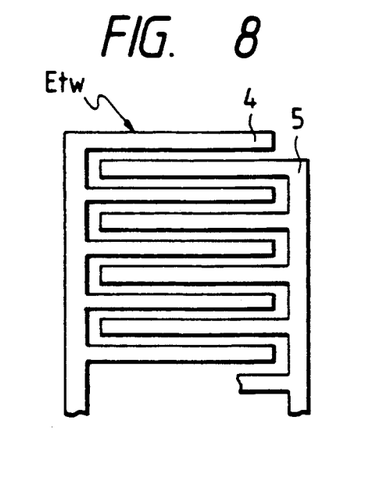
FIG. 8 is a plan view of an electrode of a recording head in an apparatus according to a second embodiment of this invention.

FIG. 8 shows a second embodiment of this invention which is similar to the embodiment of FIGS. 1-7 except for the design changes indicated hereinafter.

The optical mask PMP (see FIG. 1) is omitted from the embodiment of FIG. 8. In the embodiment of FIG. 8, the electrode Etw of the recording head ReH includes a pair of comb-shaped sub electrodes 4 and 5. The teeth of the sub electrode 4 alternate with the teeth of the sub electrode 5. An electric power source (not shown) is connected between the sub electrode 4 and the electrode Et of the recording medium D (see FIG. 1). The sub electrode 5 is directly connected to the electrode Et of the recording medium D so that the potential at the sub electrode 5 equals the potential at the electrode Et of the recording medium D.

The electrode Etw of the recording head ReH serves as an electrical mask having a function similar to the function of the optical mask PMP (see FIG. 1). The teeth of the sub electrode 4 correspond to the transparent stripes 2 of the mask PMP and form the effective linear portions TR1, TR2, . . . of the area Rz of the recording medium D (see FIG. 4) in the recording process. The teeth of the sub electrode 5 correspond to the opaque stripes 3 of the mask PMP and form the reference linear portions OP1, OP2, . . . of the area RZ of the recording medium D in the recording process.

DESCRIPTION OF THE THIRD PREFERRED EMBODIMENT

Figure 9:
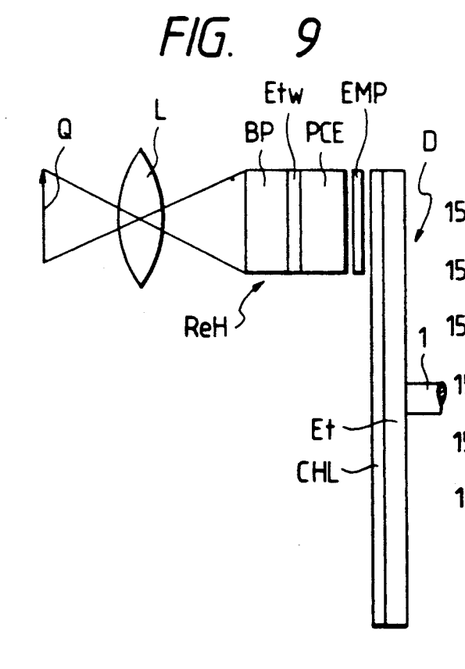
FIG. 9 is a diagram of an apparatus according to a third embodiment of this invention.

FIG. 9 shows a third embodiment of this invention which is similar to the embodiment of FIGS. 1-7 except for the design changes indicated hereinafter.

The optical mask PMP (see FIG. 1) is omitted from the embodiment of FIG. 9. In the embodiment of FIG. 9, an electrostatic shield EMP is disposed between the recording head ReH and the recording medium D.

Figure 10:
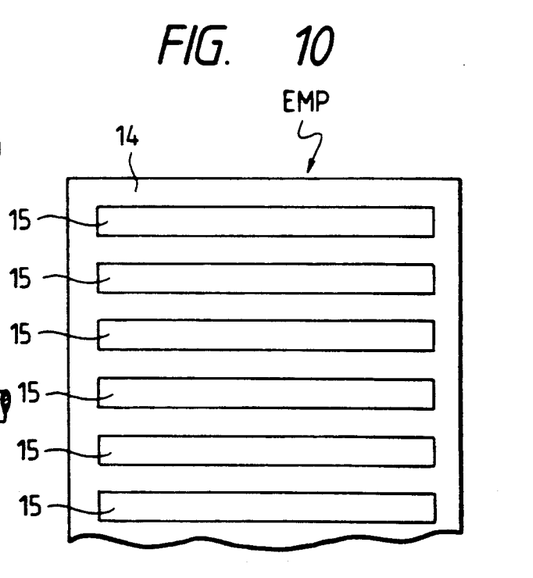
FIG. 10 is a plan view of the electrostatic shield of FIG. 9.

As shown in FIG. 10, the electrostatic shield EMP includes a metal plate 14 having a plurality of parallel slots 15 spaced at equal intervals. The metal plate 14 is directly connected to the electrode Et of the recording medium D so that the potential of the metal plate 14 equals the potential of the electrode Et of the recording medium D.

The electrostatic shield EMP serves as an electrical mask having a function similar to the function of the optical mask PMP (see FIG. 1). The slots 15 of the metal plate 14 form the effective linear portions TR1, TR2, ... of the area RZ of the recording medium D (see FIG. 4) in the recording process. The perimeters of the metal plate 14 which extend between the slots 15 serve as a mask to form the reference linear portions OP1, OP2, ... of the area RZ of the recording medium D.

DESCRIPTION OF THE FOURTH PREFERRED EMBODIMENT

Figure 11:
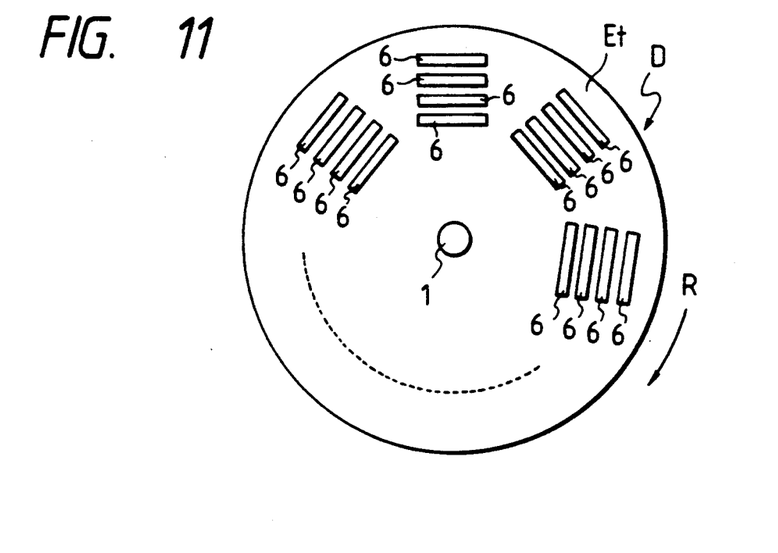
FIG. 11 is a plan view of a recording medium in an apparatus according to a fourth embodiment of this invention.
Figure 12:
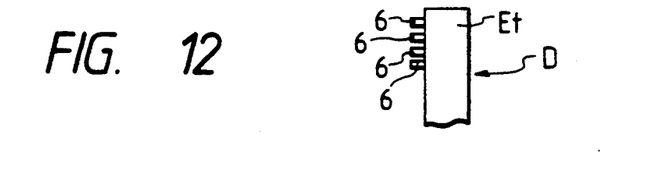
FIG. 12 is a side view of part of the recording medium of FIG. 11.

FIGS. 11 and 12 show a fourth embodiment of this invention which is similar to the embodiment of FIGS. 1-7 except for the design changes indicated hereinafter.

The optical mask PMP (see FIG. 1) is omitted in the embodiment of FIGS. 11 and 12. In the embodiment of FIGS. 11 and 12, the image forming member CHL (see FIG. 1) of the recording medium D is replaced with a plurality of sets of parallel strips 6 made of insulating member. The strips 6 extend on the electrode Et of the recording medium.

In addition, the sets of the strips 6 extend over respective image forming areas RZ of the recording medium D. In each set, the strips 6 are spaced at equal intervals. The electrode Et is exposed at regions between the strips 6.

By this arrangement, the recording medium D incorporates an electrical mask having a function similar to the function of the optical mask PMP (see FIG. 1). The strips 6 serve as the effective linear portions TR1, TR2, ... of the area RZ of the recording medium D (see FIG. 4). The exposed portions of the electrode Et between the strips 6 serve as the reference linear portions OP1, OP2, ... of the area RZ of the recording medium D.

DESCRIPTION OF THE FIFTH PREFERRED EMBODIMENT

Figure 13:
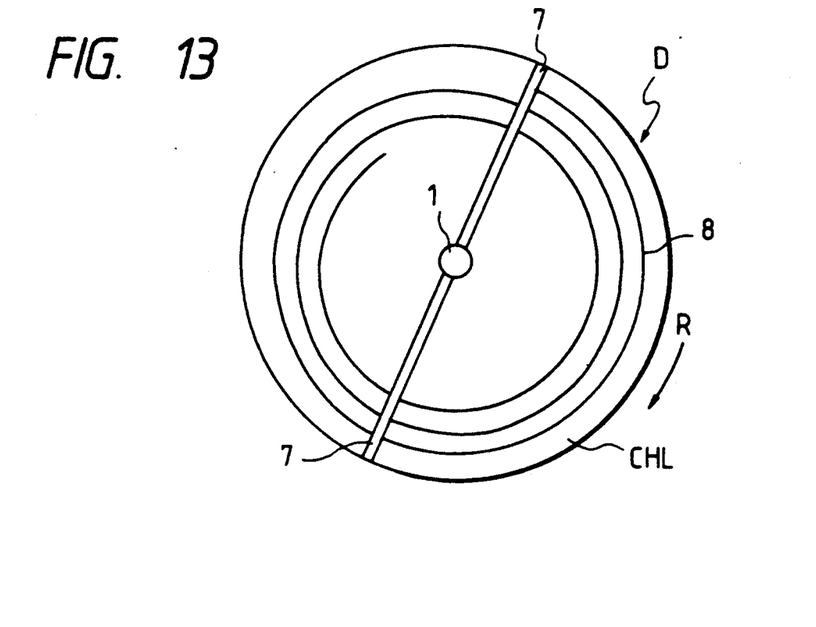
FIG. 13 is a plan view of a recording medium in an apparatus according to a fifth embodiment of this invention.

FIG. 13 shows a fifth embodiment of this invention which is similar to the embodiment of FIGS. 1-7 except for the design changes indicated hereinafter.

The optical mask PMP (see FIG. 1) is omitted in the embodiment of FIG. 13. In the embodiment of FIG. 13, majority area of the electrode of the recording medium D is covered by the image forming member CHL and forms effective portions capable of storing information. Radially-extending narrow parts 7 of the electrode of the recording medium D are exposed without being covered by the member CHL and form reference portions incapable of storing information.

As the recording medium D is rotated in the direction R, an information signal is recorded on the recording medium D in the form of a serial latent charge variation by a single recording element (not shown) and simultaneously a spiral recording track 8 is formed on the recording medium D.

A first example of the recording element includes a needle electrode. A second example of the recording element includes a laminated structure composed of a transparent electrode of a photoconductive layer, and converts laser light into a corresponding voltage. A third example of the recording element forms a spot charge latent image on the recording medium D.

The information signal is reproduced from the recording medium D by a reproducing element (not shown).

A first example of the reproducing element includes a needle electrode which detects the information-representing potential on the recording medium D through electrostatic induction. A second example of the reproducing element includes a laminated structure composed of a transparent electrode, a light modulation layer, and a dielectric mirror, and uses a laser light spot in detecting the information-representing potential variations (charge variations) on the recording medium D.

During the reproduction of the information signal from the recording medium D, the effective poritons and the reference portions 7 are alternately and sequentially scanned by the reproducing element. When the effective portions are scanned, the operation of the reproducing element is controlled into a detecting mode. When the reference portions 7 are scanned, the operation of the reproducing element is controlled into a resetting mode.

DESCRIPTION OF THE SIXTH PREFERRED EMBODIMENT

Figure 14:
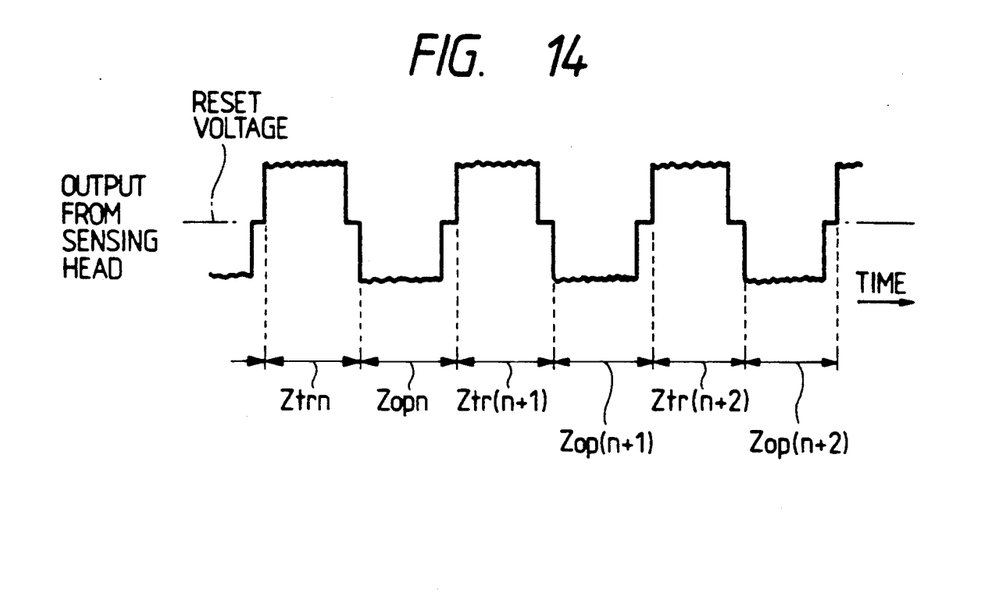
FIG. 14 is a diagram of the waveform of an output signal form a sensing head in an apparatus according to a sixth embodiment of this invention.
Figure 15:
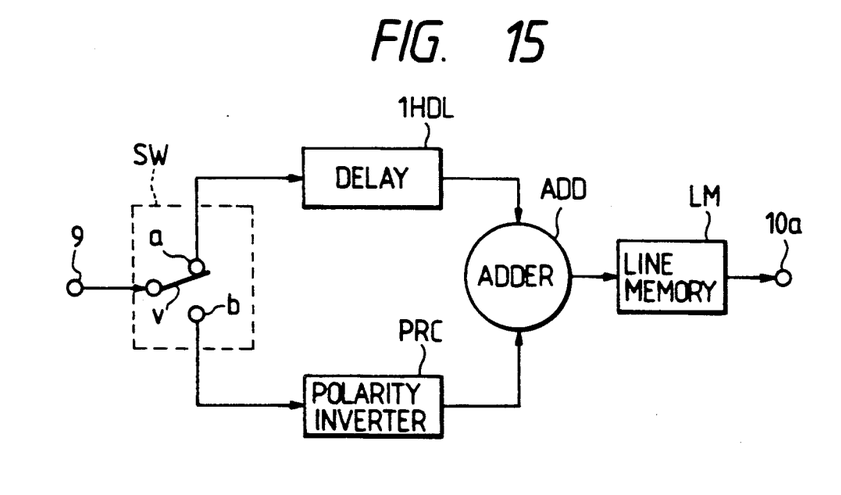
FIG. 15 is a block diagram of a signal processor in the apparatus of the sixth embodiment.

FIGS. 14 and 15 relate to a sixth embodiment of this invention which is similar to the embodiment of FIGS. 1-7 except for the design changes indicated hereinafter.

In this embodiment, as shown in FIG. 14, during each of periods Ztrn, Ztr(n+1), ... where the effective linear portions TR1, TR2, ... of the area RZ (see FIG. 4) of the recording medium D are scanned, both of the detecting mode of operation of the sensing head EDA (see FIG. 4) and the resetting mode of operation of the sensing head EDA are performed. Similarly, during each of periods Zopn, Zop(n+1), ... where the reference linear portions OP1, OP2, ... of the area RZ (see FIG. 4) of the recording medium D are scanned, both of the detecting mode of operation of the sensing head EDA (see FIG. 4) and the resetting mode of operation of the sensing head EDA are performed. The polarity of the output signal from the sensing head which occurs during the periods Ztrn, Ztr(n+1), ... is opposite to the polarity of the output signal from the sensing head which occurs during the periods Zopn, Zop(n+1), .... One Ztr period is called a horizontal scanning period and is equal to one Zop period.

As shown in FIG. 15, this embodiment includes a switch SW whose movable contact "v" receives the output signal shown in FIG. 14 from the sensing head EDA (see FIG. 4) via a terminal 9. The movable contact "v" of the switch SW is alternately moved between first and second positions at every horizontal scanning period mentioned above in response to a control signal. When the movable contact "v" of the switch SW alternately assumes the first and second positions, it connects with a fixed contact "a" and a fixed contact "b" of the switch SW respectively. The fixed contact "a" of the switch SW is connected for the horizontal scanning period to the input terminal of a delay circuit 1HDL which delays an input signal by one horizontal scanning period. The fixed contact "b" of the switch SW is connected for the horizontal scanning period to the input terminal of a polarity inverter PRC. The output terminals of the delay circuit 1HDL and the polarity inverter PRC are connected to the respective input terminals of an adder ADD. The output terminal of the adder ADD is connected to an input terminal of a line memory LM. An output terminal of the line memory LM is connected to an output terminal 10a.

When the movable contact "v" of the switch SW connects with the fixed contact "b" thereof, one horizontal scanning period of the present detection output signal from the sensing head is passed through the switch SW to the polarity inverter PRC and is inverted in polarity by the polarity iinverter PRC. Therefore, the inverted detection signal such as corresponded with Zop has the same polarity as the delayed detection signal such as corresponded to with Ztr from the delay circuit 1HDL. The inverted detection signal and the delayed detection signal are combined by the adder ADD into a resultant detection signal which is stored into the line memory LM. It is understood from FIG. 14 that the resultant output signal has a peak level twice a peak level of the detection voltage of the output signal from the sensing head. The resultant output signal is read out from the line memory LM and is transmitted via the output terminal 10a.

DESCRIPTION OF THE SEVENTH PREFERRED EMBODIMENT

Figure 16:
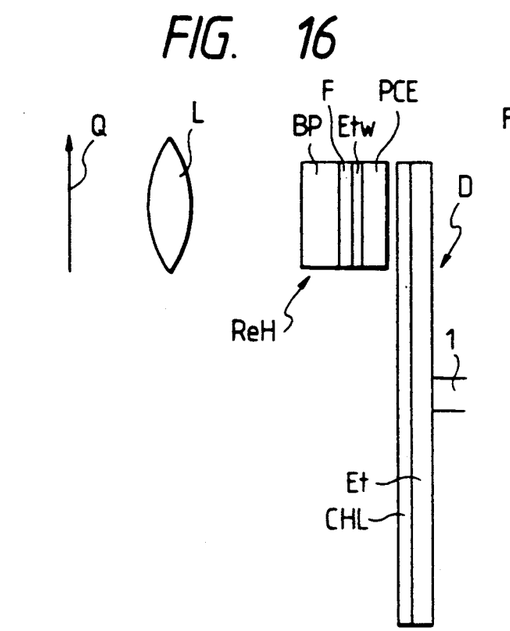
FIG. 16 is a diagram of an apparatus according to a seventh embodiment of this invention.

With reference to FIG. 16 showing a seventh embodiment of this invention, a scene of an object Q is focused by a lens L on a recording head ReH which forms a charge latent image on a disk-shaped recording medium D in correspondence with the scene of the object Q.

The recording medium D includes an electrode Et and a charge latent image forming member CHL. The electrode Et functions as a base plate of the recording medium D. The image forming member CHL is made of highly insulating material. The recording medium D is rotatable about a shaft 1. Similarly to the case of FIG. 2, when the recording medium D rotates in a direction R, the charge latent image of the object Q is sequentially recorded on areas RZ1, RZ2, ... of the recording medium D.

The recording head ReH has a laminated structure including a glass substrate or base plate BP, a color stripe filter F, a transparent electrode Etw, and a photoconductive layer PCE. An electric power source Vb (not shown) is connected between the electrode Etw and the electrode Et of the recording medium D to generate a predetermined electric field between the electrodes Etw and Et.

When an image of the object Q is formed by the lens L on the photoconductive layer PCE of the recording head ReH via the color filter F, the electric resistance of the photoconductive layer PCE varies in accordance with the image intensity of the object Q so that a charge latent image is formed on the member CHL of the recording medium D in correspondence with the image of the object Q. It should be noted that the recording medium D may have other shapes such as a tape shape, a sheet shape, or a card shape.

Figure 17:
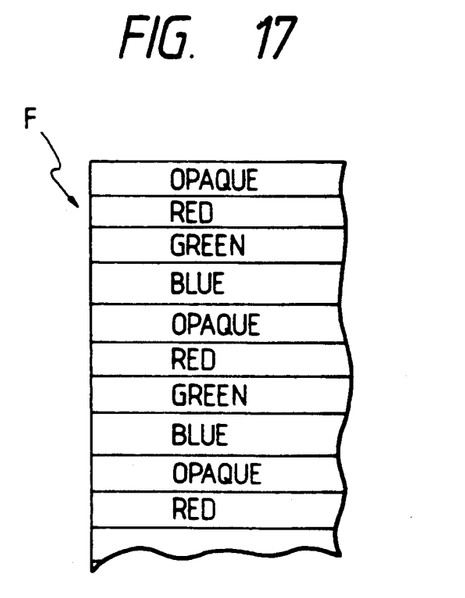
FIG. 17 is a plan view of part of the color filter of FIG. 16.
Figure 18:
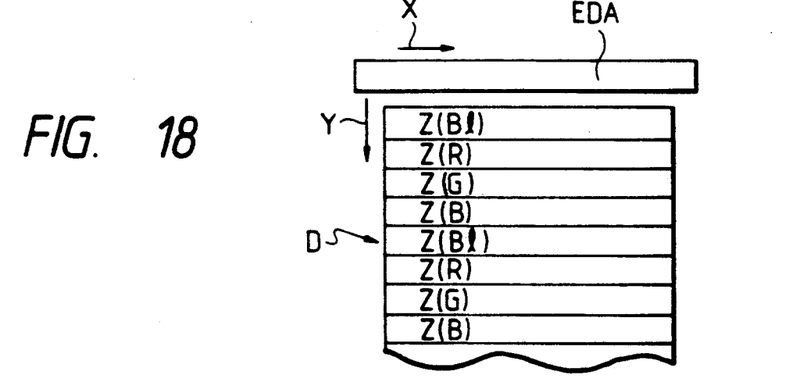
FIG. 18 is a diagram of a sensing head and the recording medium in the apparatus of the seventh embodiment.

As shown in FIG. 17, the color filter F has recurrent groups each composed of parallel stripes of opaque (black), red, green, and blue. In correspondence with the color stripe arrangement of the filter F, the charge latent image formed on the recording medium D is divided into recurrent groups each composed of stripes Z(B1), Z(R), Z(G), and Z(B) corresponding to black, red, green, and blue respectively as shown in FIG. 18. The stripe Z(B1) defines a reference portion. Specifically, the potential at the strip Z(B1) is fixed to a reference level corresponding to "black", the reference level being independent of image information. The other stripes Z(R), Z(G), and Z(B) define effective portions capable of representing image information.

The charge latent image on the recording medium D is detected by a sensing head EDA which has a structure similar to that shown in FIGS. 5 and 6. As will be described hereinafter, the sensing head EDA is moved through the plane immediately above an image forming area of the recording medium D to scan the image forming area completely. During the scan of the image forming area of the recording medium D, the line of the sensing electrodes of the sensing head EDA is held in a directional X parallel to the stripes Z(B1), Z(R), Z(G), and Z(B) and the sensing head EDA is moved step by step along a direction Y perpendicular to the stripes Z(B1), Z(R), Z(G), and Z(B).

Firstly, the sensing head EDA is moved by a suitable drive mechanism to a position directly above the reference stripe Z(B1) of the recording medium D. When the sensing head EDA resides above the reference stripe Z(B1), the resetting mode of operation of the sensing head EDA is performed. After the resetting mode of operation, the sensing head EDA is moved to and held in a position directly above the effective stripe Z(R) of the recording medium D. While the sensing head EDA remains above the effective stripe Z(R), the sensing head EDA scans linearly the effective stripe Z(R) in the direction X so that the sensing head EDA outputs a red signal. After this linear scan is completed, the sensing head EDA is moved in the direction Y to a position directly above the subsequent effective stripe Z(G) and a subsequent linear scan is performed for the effective stripe Z(G) so that the sensing head EDA outputs a green signal. Then, the sensing head EDA is moved to a position directly above the next effective stripe Z(B) and a similar linear scan is performed for the effective stripe Z(B) so that the sensing head EDA outputs a blue signal. Such resetting and scanning processes are reiterated until the image forming area of the recording medium D is completely scanned. During the scan of the image forming area of the recording medium D, a red signal, a green signal, and a blue signal are sequentially and periodically outputted from the sensing head EDA.

Figure 19:
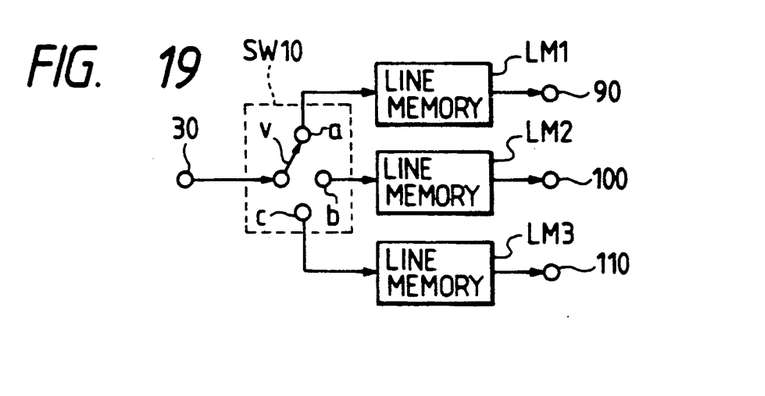
FIG. 19 is a block diagram of a signal processor in the apparatus of the seventh embodiment.

As shown in FIG. 19, a signal processor includes a switch SW10 having a movable contact "v" to which the output signal from the sensing head EDA is applied via a terminal 30. Fixed contacts "a", "b", and "c" of the switch SW10 are connected to line memories LM1, LM2, and LM3 respectively. The movable contact "v" is sequentially connected with the fixed contacts "a", "b", and "c" correspondingly with the linear scanning period of each effective stripe so that red signals, green signals, and blue signals are distributed to and stored into the line memories LM1, LM2, and LM3 respectively. The red signal, the green signal, and the blue signal are transferred from the line memories LM1, LM2, and LM3 via output terminals 90, 100, and 110 respectively. The red signal, the green signal, and the blue signal transferred via the output terminals 90, 100, and 110 are combined into a luminance signal.

What is claimed is:

1. A recording and reproducing apparatus for recording an image information corresponding to an object on a recording medium comprising:
   means for charging the recording medium in response to a light from the object as the image information and forming a charge latent image corresponding to the image information on the recording medium, wherein a surface potential of the recording medium is distributed in correspondence with the latent image;
   means provided to the charging means for forming an effective region and a reference region on the recording medium, the effective region representing the image information, the reference region being charged to a reference potential and being potentially independent of the image information;
   a sensing head sequentially detecting surface potentials in the effective region and the reference region of the recording medium through electrostatic induction, the sensing head comprising field effect transistor means having gate means and a drain means;
   a gate input capacitance of the gate means of the transistor means being charged by a leakage current between the drain means and the gate means of the transistor means;
   means for subjecting the gate means of the transistor means to a voltage electrostatically induced in correspondence with the surface potentials in the effective region and in the reference region of the recording medium;
   means for discharging a charge in the gate input capacitance to reset a voltage on the gate means of the transistor means; and
   means for timely activating said discharging means with a predetermined timing relation to the detection of the surface potential of one of the effective region and the reference region of the recording medium by the sensing head.

2. The apparatus of claim 1 wherein the effective region is divided into a plurality of sections and the reference region is divided into a plurality of sections, and the sections of the effective region alternate with the sections of the reference region.

3. The apparatus of claim 1 wherein the forming means comprises an optical mask having a transparent portion and an opaque portion corresponding to the effective region and the reference region respectively.

4. The apparatus of claim 1 wherein the forming means comprises an electrostatic shield including a metal plate having slots corresponding to the effective region, and perimeters corresponding to the reference region.

5. The apparatus of claim 1 wherein the forming means comprises:
   a recording medium;
   a color separation filter having a first-type segment for forming the reference region and a plurality of second-type segments for forming the effective region, the second-type segments corresponding to different colors respectively; so that first segments of the reference region on the recording medium are formed correspondingly with the first-type and second segments of the effective region on the recording medium are formed correspondingly with second-type segments of the color separation filter;
   a sensing head sequentially detecting surface potentials in the respective first and second segments on the recording medium through electrostatic induction.

6. The apparatus of claim 5 wherein the first-type segment of the color separation filter is opaque.

7. The apparatus of claim 5 further comprising means for separating an output signal from the sensing head into different color components corresponding to the respective second-type segments of the color separation filter.

8. The apparatus of claim 5 wherein the second-type segments of the color separation filter correspond to red, green, and blue respectively.

9. The apparatus of claim 1 wherein the forming means comprises an electrode including a pair of first and second comb-shaped sub electrodes, and wherein teeth of the first sub electrode alternate with teeth of the second sub electrode.

10. A recording medium comprising a circular electrode, and image forming members covering first parts of the electrode and forming effective portions capable of storing information, wherein radially-extending second parts of the electrode are exposed and form reference portions incapable of storing information, wherein an information signal is recorded on the recording medium in a form of a charge latent image and simultaneously a spiral recording track is formed on the recording medium.

* * * * *